United States Patent  [15] 3,693,430
Menary  [45] Sept. 26, 1972

[54] FILM INSPECTION MACHINE
[72] Inventor: Robert F. Menary, 2449 Strand, Northbrook, Ill. 60062
[22] Filed: Nov. 16, 1970
[21] Appl. No.: 89,572

[52] U.S. Cl. ........................................ 73/157, 73/159
[51] Int. Cl. ............................................. G01n 19/08
[58] Field of Search .............. 73/157, 159; 226/91, 92

[56] References Cited

UNITED STATES PATENTS

| 2,699,676 | 1/1955 | Grunwald | 73/157 |
| 2,469,608 | 5/1949 | Phillimore | 73/157 |
| 3,264,740 | 8/1966 | Veale | 73/159 |
| 3,613,444 | 10/1971 | Grunwald | 73/157 |
| 1,997,409 | 4/1935 | May | 226/91 |
| 3,352,470 | 11/1967 | Powers | 226/91 |
| 3,429,518 | 2/1969 | McKee | 226/91 |
| 3,208,654 | 9/1965 | Gasser | 226/91 |

Primary Examiner—Louis R. Prince
Assistant Examiner—Denis E. Corr
Attorney—Greist, Lockwood, Greenawalt & Dewey

[57] ABSTRACT

A machine is disclosed for inspecting motion picture film to enable improper splices, sprocket hole tears and similar defects to be detected so that appropriate repairs may be made, which machine comprises an upright cabinet having a vertical work face with reel supports on opposite sides of a center work area across which the film traverses a generally horizontal path between the reels. Film cleaning devices, thickness sensors, and hole or tear detecting devices are provided along the film path with associated operating mechanism for stopping the film travel when a defect is detected which requires repair. The film is guided by edge guide channels and guide members extending between rollers or other film supports where the sensing and detecting operations are carried out and provision is made for advancing the leading end of the film so as to automatically thread the film when a reel is placed in the machine for inspection.

10 Claims, 11 Drawing Figures

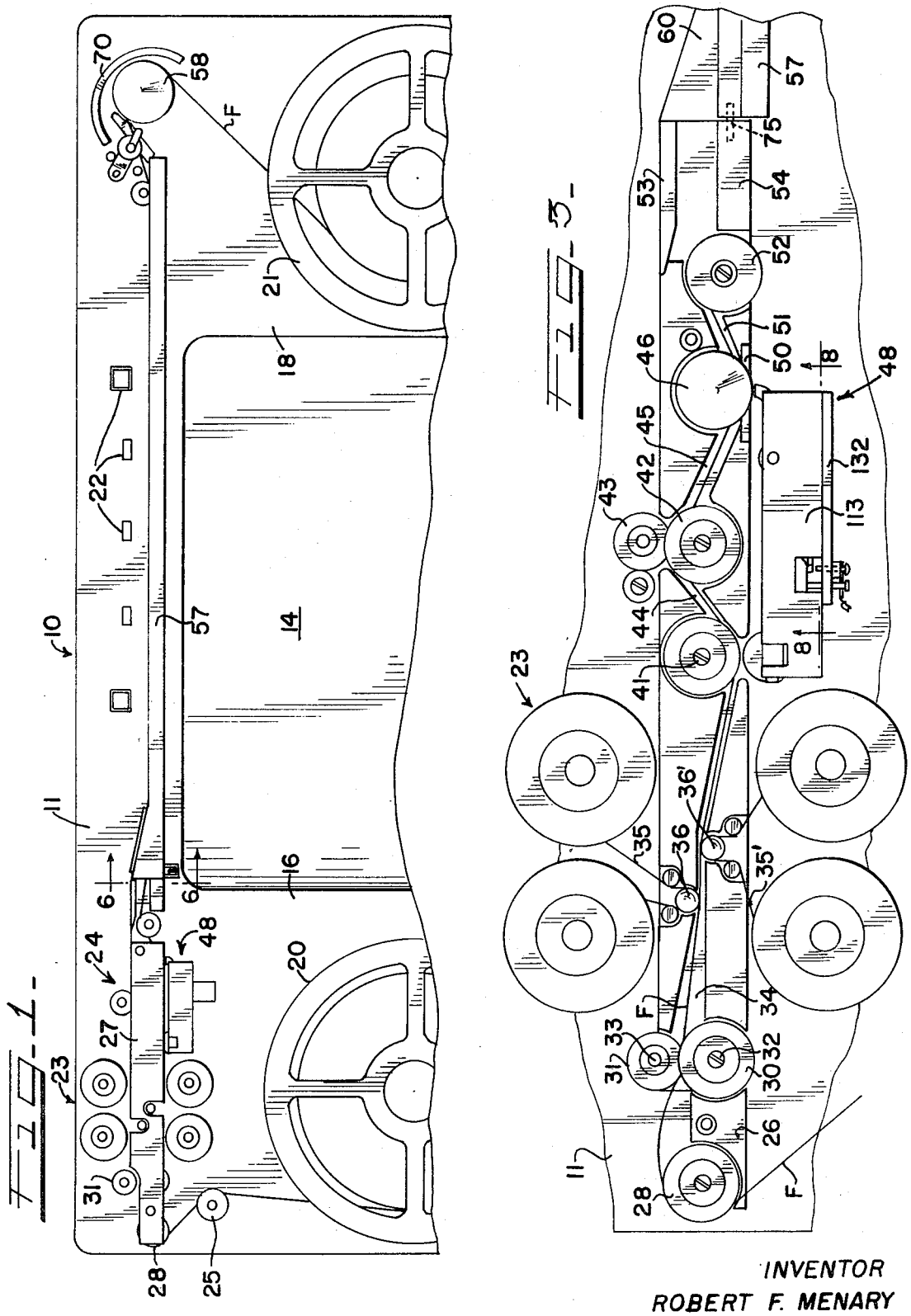

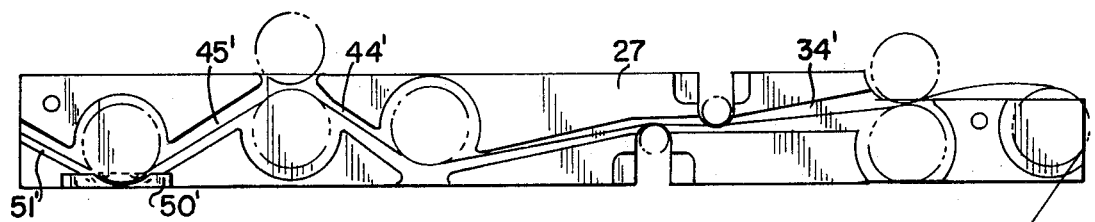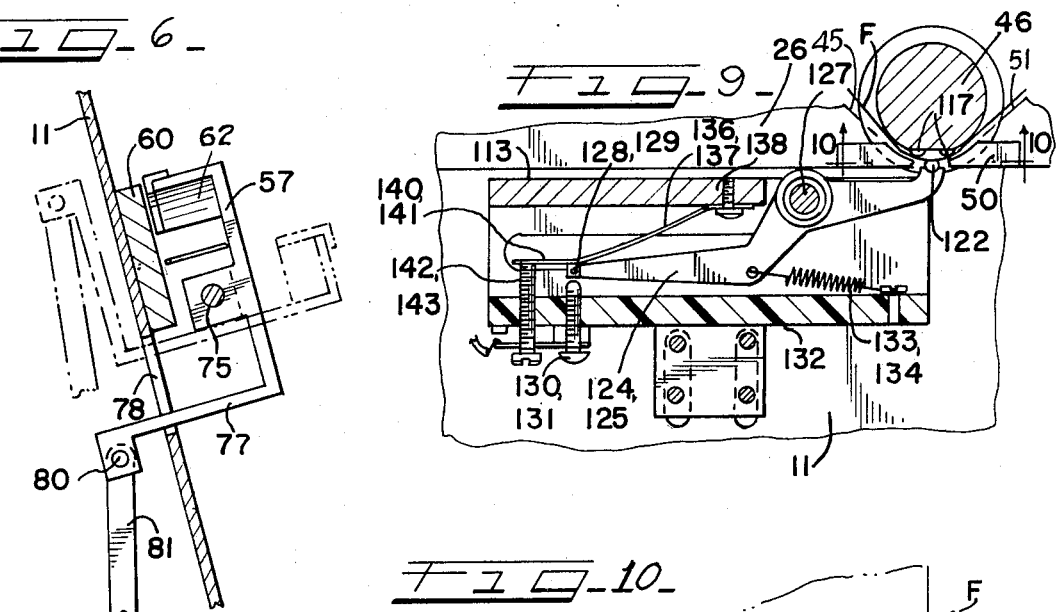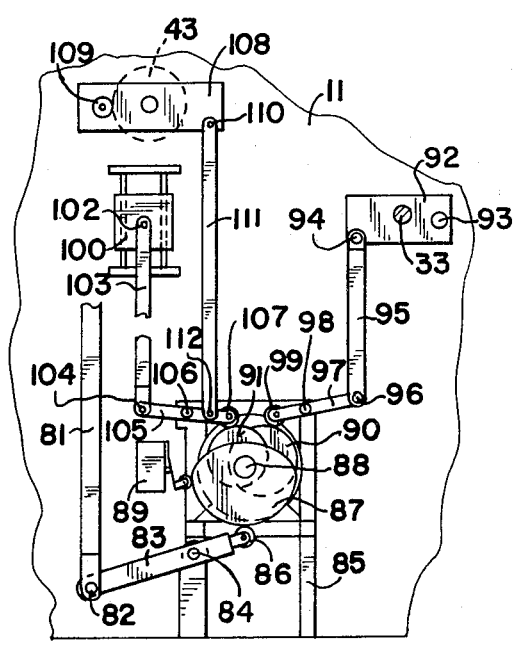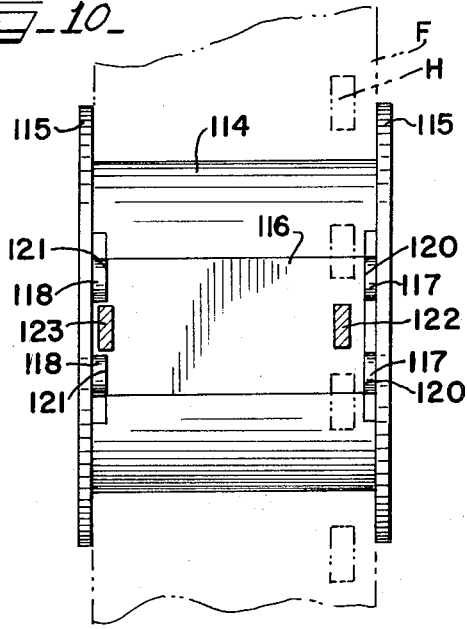

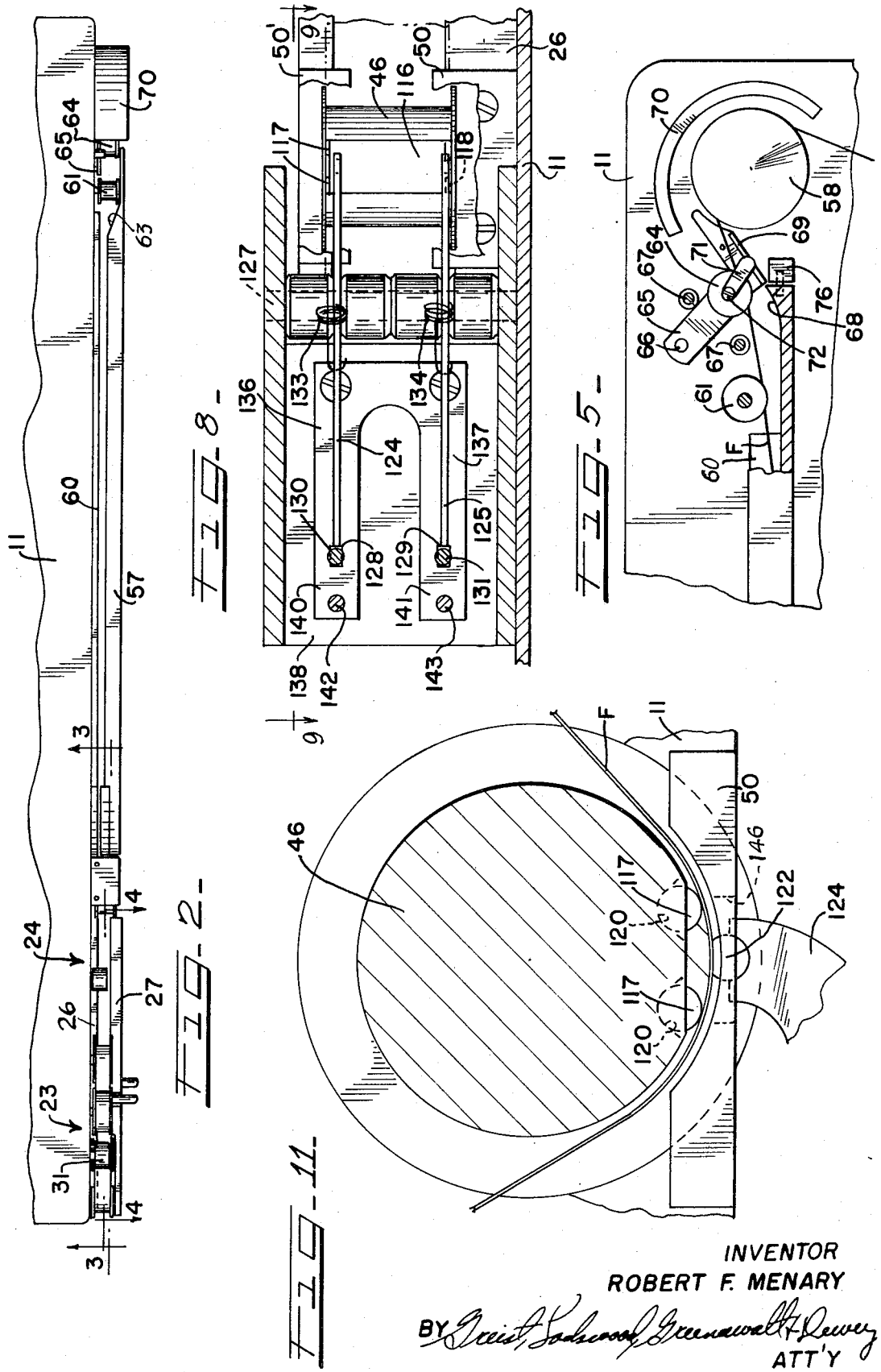

FILM INSPECTION MACHINE

This invention relates to machines for inspecting strip material such as motion picture film, and the like, and is more particularly concerned with improvements in apparatus for initially threading the film through mechanism for cleaning the film and for detecting film defects, such as sprocket hole breaks or tears which it is necessary or desirable to repair so as to insure proper feeding and tracking as the film is again run through a projector.

Motion picture film, because it is relatively fragile and easily damaged, is customarily inspected after each use, particularly in the case of commercial film when it is returned by the exhibitor, so that any damage to the film, can be checked and appropriate repairs made before it is sent on to another exhibitor. Removal of defects such as improper splices, tears and the like is necessary in order to avoid damage to the film as it runs through the film projecting machine. Machines have heretofore been designed which automatically detect thickness variations due to improper splices and the like and which are adjustable to pass splices of acceptable length and thickness while stopping the travel of the film when there are objectionable splices, sprocket hole tears, or other defects, so as to enable the operator to remove the same by substitution of a proper splice. One such machine which is described in my U.S. Pat. No. 3,180,143, granted Apr. 27, 1965, comprises a film feeding apparatus responsive to a defect detector through which the film runs and which is operated by film defects of a predetermined character to automatically stop the film feed in order for the operator to make appropriate repairs. Machines for this purpose have been available which include film supporting reels spaced on opposite sides of a work area generally on the front face of a cabinet which houses drive means and control circuitry for film driving rollers, film cleaning mechanism, and film defect detecting mechanism which are spaced along the path of travel of the film and which include appropriate support means for the film, such as rollers, during the cleaning and inspecting operations. Generally, the initial feeding or threading of the film over the various supports located between the reels has been a manual task involving a substantial amount of time. Also, adjustment for defect detection is relatively critical and frequently presents a problem, resulting from wear in film supporting parts and the like. A general object of the present invention is to provide a machine of this character having improved arrangements for supporting the film during inspection and for feeding the film through the machine.

It is a more particular object of the invention to provide a film inspection machine wherein provision is made for automatically threading the film when a reel is placed in the machine for inspection so as to quickly position the film for travel over the various supporting members and for proper tracking along the path extending between the reel containing the film to be inspected and a wind up reel on which the film is stored until the inspection is completed and ready for rewind and return to the original reel.

Another object of the invention is to provide in a film inspecting machine mechanism for detecting sprocket breaks and tears which incorporates therein an improved support for the film so as to obtain a more efficient detecting operation, greater sensitivity, smoother film travel, and resulting in less likelihood of damage to the film and less frequent need for adjustment to compensate for parts wear.

These and other objects and advantages of the invention will be apparent from a consideration of the film inspecting apparatus which is shown by way of illustration in the accompanying drawings wherein:

FIG. 1 is a front elevation showing the top portion of a film inspection machine which has incorporated therein the principal features of the invention;

FIG. 2 is a partial top plan view of the apparatus shown in FIG. 1;

FIG. 3 is an elevational view taken on the line 3—3 of FIG. 2, to an enlarged scale;

FIG. 4 is a longitudinal section, taken on the line 4—4 of FIG. 2, to an enlarged scale;

FIG. 5 is a fragmentary view showing a portion of the apparatus in FIG. 1;

FIG. 6 is a fragmentary cross sectional view taken on the line 6—6 of FIG. 1, to an enlarged scale;

FIG. 7 is an elevational view with parts omitted, showing in part the drive means and cam control arrangement for the automatic threading mechanism;

FIG. 8 is a cross section, taken on the line 8—8 of FIG. 3, to a larger scale, showing details of the sprocket hole detecting mechanism;

FIG. 9 is a cross section taken on the line 9—9 of FIG. 8;

FIG. 10 is a fragmentary view taken on the line 8—8 of FIG. 7, to an enlarged scale; and FIG. 11 is a sectional view showing a part of FIG. 9, to a larger scale.

The illustrated apparatus is mounted on an upright cabinet 10, the top part of which is shown in FIG. 1. The cabinet 10 has a front wall or face 11, with the upper portion inclined somewhat toward the rear, and is divided into a middle section 12 which is recessed to provide a work area 14 for the operator and two side sections 16 and 18 on the front faces of which provision is made for mounting in detachably supported relation film reels 20 and 21, the latter constituting a support for the film as it is drawn through the inspection area and having a motor drive with suitable electrical control circuitry. The work area provided by the recess 14 is adapted to accommodate a work table or shelf (not shown) for splicing equipment or the like. Manual control switches, signal lamps and the like, some of which are indicated at 22, may be conveniently positioned adjacent the work area 14 so as to be within sight of or convenient reach of the operator. Film cleaning apparatus is indicated at 23 and defect detecting apparatus is indicated at 24 on the face of the left section 16 of the machine as viewed in FIG. 1. The film is supported at spaced points as it travels across the top face of the machine and mechanism is provided for automatically guiding the leading end of the film so as to thread the same at the start of operations.

The film F is withdrawn from the reel 20 and passes over a guide roller 25 and then to the entrance end or beginning of a generally horizontal inspection path. The film path at the top of the left cabinet section 16 is defined in part by film supporting members and in part by recesses in the front face of a spacer bar or mounting plate 26 secured on the front wall 11 of the cabinet 10 and co-operating recesses on the inner face of a guard plate 27 which are disposed in confronting relation with the recesses in the spacer plate 26 so as to provide guideways for lateral edge portions of the film F. The guideway forming recesses in the guard plate 27 which co-operate with the recesses in the spacer plate 26 will be identified by the same numerals primed. The various film supporting members have their ends extending into shallow recesses in the front face of the spacer plate 26 and the confronting face of the guard plate 27 which is mounted parallel to the spacer plate 26 with the confronting faces of the two plates spaced a distance less then the width of the film. The guard plate 27 is detachably mounted so that it may be readily removed to provide access to the film path and the film support members. The spacer plate 26 is also detachably mounted on the cabinet face or wall 11 so that the apparatus may be adapted for mounting on a different wall structure. Alternatively, the cabinet wall face may be provided with the necessary recesses for the film support members and the film edge guideways.

At the entrance to the horizontal guideway the film F passes over a guide roller 28 and is advanced or threaded between drive rollers 30 and 31 which are supported on pin shafts 32 and 33 with the former being in a fixed position and the latter being movable as hereinafter described so as to separate the rollers 30 and 31 for initial threading. The film F passes from between the rollers 30 and 31 which constitute the drive for advancing the film during automatic threading, into relatively shallow side guide channels or recesses 34 and 34' which are cut in the plate 26 and the inside face of the plate 27, respectively, and which extend through the area in which the cleaning of the film is effected by a cleaning mechanism 23. In the form of the cleaning mechanism shown a pair of cleaning tapes 35 and 35', which are supplied with a suitable cleaning fluid, are run over guide rollers 36 and 36', the latter being positioned, as shown in FIGS. 3 and 4, so as to engage the tapes 35 and 35' with opposite sides of the film F, as the film advances in the guideways 34, 34' to a thickness sensing mechanism 24. The thickness sensing mechanism 24 may comprise a thickness detecting arrangement of the character shown in my U.S. Pat. Nos. 3,180,143 or 3,501,760. A guide roller 40 is mounted on a pin 41 with its opposite ends extending into shallow recesses in the spacer plate 26 and the guard plate 27 beneath which the film travels to the thickness detecting rolls 42 and 43 with recesses forming film side edge guideways 44 and 44' extending in the spacer plate 26 and the guard plate 27 to a direct the leading end of the film between the rolls 42 and 43. The rolls 42 and 43 will be separated to accommodate passage of the film during the automatic threading interval. From the thickness detecting rolls 42 and 43 the film travels in side edge guideways 45, 45' to a fixed film support 46 which constitutes a part of a sprocket hole detector mechanism 48. Track forming side edge guide members 50 and 50' are provided on the spacer plate 26 and guard plate 27 immediately below the film support member 46 to direct the end of the film F into side edge guide recesses 51, 51' which extend to guide roller 52 which is disposed at the end of guard plate 27 and at the left side of the work area 14. The side edge guide recess 51 (FIG. 3) extends up and around the top of guide roller 52 to a top guide plate 53 which overhangs in part the guide roller 52 to a top guide plate 53 which overhangs in part the guide roller 52 and also overhangs an elongate film support or guide block 54 extending from the cabinet wall 26 and having its top face 55 spaced vertically below the bottom face 56 of the guide plate 53 so as to form a confining pathway or guideway for the film end during automatic threading.

An elongate guide channel 57 extends across the top of the work area 14 and to a point adjacent a guide roller 58 at the end of the horizontal film path. The guide channel 57 is pivotally mounted at its opposite ends so that it may swing between a closed position where the open face thereof is substantially closed by a spacer forming plate or bar member 60 on the cabinet wall 11 (FIG. 6) so as to form a substantially closed guideway or channel for the film, and an open position where the film is fully exposed. The closed and open positions of the guide channel 57 are shown in solid and phantom lines in FIG. 6. The spacer bar 60 is aligned longitudinally with spacer plate 26 and serves to provide an aligned guideway for the film. When the channel 57 is swung to the open position the film strip will extend between the guide roller 52 and the guide roller 61 which is mounted at the top of the right cabinet section 18 a short distance from the end guide roller 58. The channel 57 has a flared opening 62 at the entrance end. The top flange, in the closed position, is cut away at 63 (FIG. 2) at the exit end to accommodate, when the channel 57 is in closed position, a roller 64 which is carried on the end of an arm 65. The arm 65 is pivotally mounted at 66 and controls a switch in the film drive circuit for stopping the film drive motor. The roller 64 rides on the portion of the film between the rollers 61 and 58 and, if there is a complete break in the film which allows the roller 64 to swing downwardly, it cuts off the current to the film drive motor. Stop pins or posts 67 limit the swinging movement of the roller 64. When there is no film engaging the roller 64 it drops down to a position where it is spaced from an upwardly curved surface 68 on the end of the channel member 57, when the latter is in closed position (FIG. 5), so as to guide the film end onto the upwardly directed surface of a fixed guide block 69 which is spaced below a semi-circular outer guide member 70, the latter extending partially about the periphery of the end roller 58. A small guard member 71 is carried on the end of the supporting shaft 72 for roller 64 which co-operates with guide members 69 and 70 to hold the film edges in line and guide the free end thereof over the roller 58 at the end of the automatic film threading cycle, leaving the film end free for manual attaching to the reel 21.

The guide channel 57 is mounted at the entrance end on a pivot pin 75 (FIG. 6) extending from the end of the guide block 54 while the exit end is mounted on a pivot bearing 76 (FIG. 5). At the entrance end of the channel 57 an angle arm 77 extends through a slot 78 in the cabinet wall 11 and is pivotally connected at 80 to the top end of a link bar 81. At its lower end the link bar 81 is pivoted at 82 to one end of a rocker arm 83 which is pivotally mounted at 84 on a fixed part of the bracket 85 and carries at its opposite end a cam roller 86 engageable with a cam 87 on a cam shaft 88 mounted on the bracket 85 and driven by a suitable motor which is controlled by a cam switch 89 and which may be brought to a quick stop with practically no overrun.

The cam shaft 88 carries additional cam plates 90 and 91, the former controlling the feed of the film for automatic threading and the latter controlling the opening and closing of the thickness sensing rollers 42, 43 and sprocket hole detector mechanism 48. The film threading drive roller 31 (FIG. 3 and 7) is carried on a support arm 92 which is pivoted at 93 on the back face of cabinet wall 26 and pivotally connected at 94 to a vertically disposed link 95 which extends to and is pivotally connected at 96 to a rocket arm 97 which is pivoted at 98 on the frame 85 and carries a cam roller 99 for engaging with the cam 90 on the shaft 88. The threading drive roller shaft 32 extends through a slot provided in the cabinet wall 26 to accommodate movement of the roller 31 between film driving and non-driving relation with the co-operating roller 30. The film drive roller 31 is driven by a separate motor (not shown) with a drive connection which permits movement of roller 31 while it is being driven.

The sprocket hole detector mechanism 48 (FIGS. 3, 6, 7 and 8), except for film support member 46, is mounted on a carriage forming block 100 which is carried on a slide support 101, with the latter having a pivot connection at 102 with the upper end of a vertically disposed link 103. The link 103 has a pivotal connection at 104 with a rocket arm 105 which is pivoted at 106 on the bracket 85 and carries a cam follower roller 107 engaging the cam plate 91. The roller 43 of the thickness detector mechanism is mounted on an arm 108 pivoted at 109 on the cabinet wall 11 and pivotally connected at 110 with the upper end of link bar 111 which has its lower end pivoted at 112 to the rocker arm 105 so that the latter opens and closes both detector mechanisms.

The sprocket hole detector mechanism 48 comprises the film support member 46 and a contact arm or detector arm assembly which is mounted in an elongate housing 113 (FIGS. 3 and 8 to 11). The film support member 46 comprises a generally cylindrical body member 114 having end flanges 115 and 115' which are spaced axially of the body member 114 a distance slightly greater than the width of the film F so that they will guide the lateral edges of the film and confine the film to a predetermined path. The body member 114 has a flat axially extending face portion 116 at the opposite ends of which pairs of sapphire jewel members 117 and 118 are seated in recesses 120 and 121. Each of the jwel members is shaped to provide a relatively narrow curved edge which extends above the flat surface 116, in a plane generally parallel with the adjacent end flange 115 or 115', and on which the marginal edge of the film is adapted to ride. The respective film supporting jewels, in each pair thereof, are spaced in the direction of film travel, a comparatively short distance apart so that the film F, which is curved around the flat surface 116 (FIG. 11) rides on the same, and with a relatively small amount of longitudinal tension, will bridge across the space between the jewels of each pair thereof, bowing outwardly and normally supporting the pick up detector jewels 122 and 123 on the ends of the detector arms 124 and 125. The detector arms 124 and 125 are carried in the rectangular housing 113 and are pivotally mounted on a shaft 127 extending transversely of the housing 113 near one end thereof. The detector arms 124 and 125 carry at the ends opposite the jewels 122, 123 contact points 128 and 129 for engagement with contact screws 130 and 131. The contact screws 130, 131 extend through the bottom plate 132 on the housing 113 which is formed of electrical insulating material. The contact points 128, 129 and screws 130, 131 form part of the electrical control circuitry. The arms 124 and 125 are urged counterclockwise about the supporting shaft 127 in a direction to make contact with the contact screws 130, 131 by tension springs 133 and 134 which extend between the arms 124 and 125 and anchorage screws on the bottom plate 132. A movement damping arrangement is provided which comprises leaf spring members 136, 137 anchored at one end to the top wall 138 of the housing 126 and extending downwardly so as to rest the ends thereof on a pair of adjustable screws 142 and 143. The end portions 140, 141 of the spring members 136 and 127 are spaced above the top ends of the contact screws 130, 131 and aligned therewith, with the spacing being a relatively small distance, so that the spring ends are engaged by the ends of the arms 124 and 125 when they are moved a short distance out of contact with the contact screws 130 and 131 by engagement with a bowed film surface. In FIGS. 9 and 11 the normal position of the arms 124 and 125 is shown when the jewels carried thereby bear on an unbroken edge or margin of a film supported on the jewels 120 and 121. The arms 124 and 125 are spaced laterally a distance which locates the jewel 122 in the line of the sprocket holes H in the film F and the jewel 123 adjacent to the line of the sound track at the other side of the film, when a sound track is present on the film. The guide members 51, 51' may be slotted as indicated at 146 in FIG. 11, or cut away if required to permit the jewels 122, 123 to engage the film margins and allow the arms 124, 125 to swing on the pivot shaft 127. Any breaks in the film or tears in the sprocket holes in the areas in which the jewels 122 and 123 engage the film will result in swinging of the arms 124 or 125 to make contact with the contact screws 128 and 129 which will actuate a signal or stop the travel of the film through operation of the control circuitry, enabling the operator to observe the defect and repair the same.

In using the apparatus the film is supplied on the reel 20 and the leading end hand fed around the guide rollers 25 and 28 for insertion between the automatic feed rollers 30 and 31, the latter being normally positioned out of engagement with the roller 30. The automatic threading circuit is then activated with the cam shaft 88 (FIG. 7) being driven so that the cams thereon move the roller 31 into film driving position, open the detector mechanisms to permit free passage of the film end and swing the channel 57 to closed position. The drive cycle for the cam shaft 88 is such that the leading end of the film will be advanced around the end roller 58 a sufficient distance to permit the end to be grasped and attached to the reel 21. When the driving cycle is completed, the threading drive roller 31 is automatically moved out of film driving position, the detecting mechanisms are closed on the film and the guide channel is swung to open position allowing access to the film at the work area 14. The cycle of operation of the cam shaft 88 is controlled by switch 89 so that each cycle of operation is completed and the film is then ready for travel through the machine, subject to interruption of the advancing movement when defects are sensed by the detector mechanisms and the film drive is discontinued through operation of the control circuitry.

I claim:

1. An apparatus for inspecting motion picture film which comprises means forming an upright supporting surface and means for mounting thereon film carrying reels on opposite sides of a work area, means defining a generally horizontal path of travel for the film which extends between the reels, film support members mounted along said path of travel and having associated means for sensing defects in the film as the film is advanced between said reels, said path defining means comprising a pair of parallel, spaced plate members having oppositely disposed guideway forming grooves extending between said film support members for receiving the opposite edges of the film so as to guide the same between said film support members, and an elongate guideway forming member extending across said work space, said elongate guideway forming member being mounted for movement between a closed, film confining guideway forming position and a normally open position where access may be had to the film by an operator positioned at said work area, film threading drive rollers for advancing the film along the path between said reels, said film threading drive rollers being normally in non-driving separated relation, means for driving one of said film threading drive rollers, means for bringing said film threading drive rollers into film engaging relation, means to move said elongate guideway forming member between open and closed positions, and control means for bringing said film threading drive rollers into engagement and for moving said elongate guideway forming member into closed position so as to automatically feed the leading end of the film between the reels upon the leading end of the film being positioned between said film threading rollers.

2. An apparatus for inspecting motion picture film as set forth in claim 1 wherein said elongate guideway forming member is channel-shaped and pivotally mounted at its opposite ends so that upon movement to closed position said member forms three sides of a guideway forming chamber.

3. An apparatus for use in inspecting motion picture film which comprises means forming a support, means for mounting film carrying reels on said support at opposite sides of a work area, means defining a generally horizontal path of travel for the film extending between the reels, film support members mounted along said path of travel and having associated means for sensing improper splices, tears and other defects in the film as the film is advanced between said reels, said path defining means comprising a pair of parallel, spaced plate members having oppositely disposed grooves for receiving the opposite edges of the film so as to at least form a guideway for the same between said film support members and an elongate guideway forming channel member extending across said work space, said channel member being mounted at its ends so as to move between a closed, film confining guideway forming position and a normally open position where access may be had to the film by an operator positioned at said work space, film threading drive means for closing on the film and advancing the film across said work space, said drive means being normally in an open non-driving position, means for closing said film threading drive means so as to engage the film and advance the same, means to move said channel member between open and closed positions, and automatic control means for operating said film threading drive means and for moving said channel member into and out of closed position so as to automatically thread the film.

4. An apparatus for inspecting motion picture film as set forth in claim 3 wherein said means for sensing defects comprises film engaging members which are mounted for movement between open and closed positions and said automatic control means including means to open said film engaging members for threading and thereafter to close said film engaging members at the end of a film threading cycle.

5. An apparatus for inspecting motion picture film as set forth in claim 3 wherein said path defining plate members are recessed to accommodate the ends of the members which support the film for operation of the means for sensing improper splices, tears and other defects with the recesses connected by said grooves for receiving opposite edges of the film.

6. An apparatus for inspecting motion picture film as set forth in claim 3 wherein said channel member is channel-shaped and movable on end pivots to and from a guideway forming position where the open face is disposed in opposed relation to said support means.

7. An apparatus for inspecting motion picture film as set forth in claim 6 wherein power means is provided for normally advancing the film when it is threaded between said reels and said channel-shaped member is pivotally mounted at its opposite ends with the entrance end flared to insure entry of the leading end of the film and with the exit end cut away to accommodate movement of a film engaging roller which constitutes a stop means for interrupting the advance of the film if there is a break in the film.

8. In an apparatus for inspecting film for sprocket hole tears and similar defects, a support member for a traveling film and an associated tear detector unit which comprises an elongate rigid arm member having a film engaging jewel member on one end thereof and an electrical contact member on the other end thereof, said arm member being pivotally supported intermediate its ends and resiliently urged in a direction about its pivotal support to engage the jewel member with a marginal portion of the film traveling on said film support member, an electrical contact member mounted adjacent the other end of said arm member so as to be engaged by the contact member on said arm member upon swinging movement of the film engaging end of said arm member due to passage of a tear in the film and said member for supporting the film comprising stationary parallel flange members spaced apart a distance slightly greater than the width of the film which constitute edge guide means, relatively thin jewel members adjacent said flange members, said jewel members having sets of rounded jewel surfaces, the surfaces of each set thereof being spaced from each other in the direction of travel of the film and supporting the film at its margins leaving the film unsupported between said spaced jeweled surfaces and being bowed outwardly for contact by the jeweled member on said arm member.

9. In an apparatus for inspecting film as set forth in claim 8 wherein said relatively thin jewel members are set in recesses in the film support member which are adjacent said flange members.

10. In an apparatus for inspecting film for sprocket hole tears and similar defects, a support member for a traveling film and an associated tear detector unit which comprises an elongate rigid arm member having a film engaging jewel member on one end thereof and an electrical contact member on the other end thereof, said arm member being pivotally supported intermediate its ends and resiliently urged in a direction about its pivotal support to engage the jewel member with a marginal portion of the film traveling on said film support member, an electrical contact member mounted adjacent the other end of said arm member so as to be engaged by the contact member on said arm member upon swinging movement of the film engaging end of said arm member due to passage of a tear in the film and said member for supporting the film comprising parallel flange members spaced apart a distance slightly greater than the width of the film and defining the film path, which flange members constitute stationary edge guide means, rounded jewel surfaces which support the film at its margins, said rounded jewel surfaces comprising relatively thin jewel members set in recesses in the film support member which are adjacent said flange members, which jewel members are arranged in pairs with the respective members of each pair spaced in the direction of film travel so that the film will bridge across each pair of said jewel members and normally support the film engaging jewel member on said rigid arm member with said film being bowed outwardly for contact by the jewel member on said arm member.

* * * * *

UNITED STATES PATENT OFFICE
CERTIFICATE OF CORRECTION

Patent No. 3,693,430                         Dated  Sept. 26, 1972

Inventor(s)   Robert F. Menary

It is certified that error appears in the above-identified patent and that said Letters Patent are hereby corrected as shown below:

On the first page, the name of the assignee -- PAULMAR, INCORPORATED -- has been omitted.

Column 3, line 53, delete "a"

Column 4, lines 1 and 2, cancel "to a top guide plate 53 which overhangs in part the guide roller 52"

Signed and sealed this 13th day of March 1973.

(SEAL)
Attest:

EDWARD M. FLETCHER, JR.                ROBERT GOTTSCHALK
Attesting Officer                       Commissioner of Patents